US012671029B1

(12) United States Patent

Yang et al.

(10) Patent No.: US 12,671,029 B1

(45) Date of Patent: Jun. 30, 2026

(54) METHOD FOR PREPARING Nd—Fe—B-DIFFUSED PERMANENT MAGNETS BASED ON PRESSURE GRADIENTS

(71) Applicant: CHINA JILIANG UNIVERSITY, Hangzhou (CN)

(72) Inventors: Hangfu Yang, Hangzhou (CN); Lei Zhou, Hangzhou (CN); Qiong Wu, Hangzhou (CN); Xiukun Hu, Hangzhou (CN); Jiage Jia, Hangzhou (CN); Hongliang Ge, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/398,551

(22) Filed: Nov. 24, 2025

(51) Int. Cl.

| | |
|---|---|
| ***H01F 41/02*** | (2006.01) |
| ***C22C 38/00*** | (2006.01) |
| ***H01F 1/057*** | (2006.01) |

(52) U.S. Cl.

CPC ....... *H01F 41/0293* (2013.01); *C22C 38/005* (2013.01); *H01F 1/0576* (2013.01); *H01F 1/0577* (2013.01); *H01F 41/0266* (2013.01)

(58) Field of Classification Search

CPC ............... H01F 1/0571; H01F 41/0266; H01F 41/0293; H01F 1/057; H01F 1/0576; H01F 1/0577; G06F 11/2025; G06F 11/2033; G06F 11/3055; G06V 10/98

See application file for complete search history.

(56) References Cited

U.S. PATENT DOCUMENTS 6,444,142 B1 * 9/2002 Matsumoto ............. C01F 11/20 423/466

2025/0157729 A1 * 5/2025 Wu ....................... H01F 1/0577

FOREIGN PATENT DOCUMENTS

CN 105810425 A * 7/2016

OTHER PUBLICATIONS

NPL: on-line translation of CN105810425A, Jul. 2016 (Year: 2016).*

NPL: Ferromagnetic materials under high pressure in a diamond-anvil cel: a magnetic study, Chinese Physics B. vol. 23, No. 7, (2014), pp. 070701-1-6, 2014 (Year: 2014).*

* cited by examiner

*Primary Examiner* — Jie Yang

(74) *Attorney, Agent, or Firm* — Birchwood IP

(57) ABSTRACT

The present invention discloses a method for preparing Nd—Fe—B-diffused permanent magnets based on pressure gradients, involving the steps preparing a Nd—Fe—B permanent magnet precursor through a mechanical grinding process, a press molding process, and a sintering process; cutting the Nd—Fe—B permanent magnet precursor into a Nd—Fe—B permanent magnet sample with a lateral size of 80-150 μm and a thickness of 5-20 μm; and forming a film of rare earth elements or other metal elements on one side of the Nd—Fe—B permanent magnet sample by magnetron sputtering as a diffusion source, so as to obtain a lateral heterojunction structure. For this method, it is possible to enable the rare earth elements to efficiently and uniformly penetrate the $Nd_2Fe_{14}B$ grains and the grain boundaries, so as to noticeably enhance coercivity and thermal stability of materials without damaging crystalline orientation, reducing magnetic energy product loss and improving overall performance of permanent magnets.

9 Claims, 2 Drawing Sheets

METHOD FOR PREPARING Nd—Fe—B-DIFFUSED PERMANENT MAGNETS BASED ON PRESSURE GRADIENTS

FIELD OF THE INVENTION

The present invention relates to the technical field of magnetic materials, in particular to a method for preparing Nd—Fe—B-diffused permanent magnets based on pressure gradients.

BACKGROUND OF THE INVENTION

Since the Nd—Fe—B permanent magnet material made its debut, it has been widely applied in fields such as new energy vehicles, wind power generators, high-speed electric motors, electronic devices, and aerospace equipment due to its excellent magnetic properties. A $Nd_2Fe_{14}B$ phase predominating in the Nd—Fe—B permanent magnet has high remanence, high magnetic energy products, and good magnetic anisotropy; however, it is prone to degradation of magnetic properties in high-temperature environments, which seriously limits its further promotion and application in premium equipment.

Currently, a dominant method for improving overall performance of the Nd—Fe—B permanent magnet is a technology of doping rare earth elements, in which it is possible to noticeably improve coercivity and thermal stability of materials dopped with heavy rare earth elements such as Dy and Tb. However, the reason that a heavy rare earth element, in a $Nd_2Fe_{14}B$ main phase, easily causes lattice distortion and a decrease in magnetic energy product and the heavy rare earth is a rare resource and costly, limiting promotion and application of this method. On the other hand, a way of partially replacing Nd with light rare earth elements (such as La and Ce) can reduce raw material costs, but it noticeably causes a decrease in magnetic properties and cannot meet the requirements for high-performance applications. Therefore, how to strike a balance between availability of rare earth elements and magnetic properties has become a key technical problem confronted chronically in this field.

A traditional method for doping rare earth mainly involves alloy melting, diffusion processes, vapor deposition, and surface coating, which improve high-temperature stability and coercivity of neodymium-iron-boron to some extent, but generally have the following problems.

(1) Uneven distribution of dopant elements in a matrix causes a big fluctuation of magnetic properties in a local zone.

(2) A limit on diffusion depth of rare earth elements makes it difficult to achieve deep penetration and uniform distribution.

(3) Complexity in processes makes it easy to introduce impurities or brittle phases, which affect stability of mechanical and magnetic properties of materials.

(4) Low availability of elements and resultant serious waste of resources are disadvantageous to large-scale production of high-performance permanent magnets.

In addition, an existing thermal diffusion method mainly depends on a temperature gradient-driven process, which results in a single diffusion direction, and proneness to disrupting an orientation of the $Nd_2Fe_{14}B$ main phase under high-temperature conditions, causing a noticeable decrease in magnetic energy product. Therefore, how to propel a uniform diffusion of rare earth elements at grain boundaries while maintaining a crystal orientation of a main phase is a technical problem that urgently needs to be solved.

SUMMARY OF THE INVENTION

In order to solve the above problem, the present invention provides a method for preparing Nd—Fe—B-diffused permanent magnets based on pressure gradients, which consists in the steps of using a diamond anvil cell (DAC) to build a lateral pressure gradient at a microscopic scale and combining it with a lateral heterojunction structure formed by magnetron sputtering, so as to enable rare earth or metal elements to diffuse uniformly in a preset direction under conditions of high pressure difference and high temperature, thereby making it possible to achieve high-efficient penetration of rare earth elements without damaging a crystal orientation of a magnet, and then reduce magnetic energy product losses to the maximum while improving coercivity and thermal stability, and effectively remedy the shortcomings of existing technologies.

The present invention is embodied in the following technical solution. A method for preparing Nd—Fe—B-diffused permanent magnets based on pressure gradients, includes the following steps.

(1) Preparing a Nd—Fe—B permanent magnet precursor through a mechanical grinding process, a press molding process, and a sintering process.

(2) Cutting the Nd—Fe—B permanent magnet precursor into a Nd—Fe—B permanent magnet sample with a lateral size of 80-150 μm and a thickness of 5-20 μm.

(3) Forming a film of rare earth elements or other metal elements on one side of the Nd—Fe—B permanent magnet sample by magnetron sputtering as a diffusion source, so as to obtain a lateral heterojunction structure.

(4) Putting the lateral heterojunction structure into a diamond anvil cell (DAC), and setting an asymmetrically filled medium zone inside a pad of the diamond anvil cell, which has one end as the diffusion source filled with NaCl, and another end filled with c-BN or KBr, so as to form a lateral pressure difference.

(5) Performing local laser heating or overall electric heating while maintaining a pressure gradient, and keeping high-pressure and high-temperature for a certain duration, so that the rare earth elements or the metal elements in the diffusion source to diffuse into a Nd—Fe—B matrix, so as obtain a high-performance Nd—Fe—B permanent magnet.

As a preferred technical solution, the Nd—Fe—B permanent magnet precursor contains an $Nd_2Fe_{14}B$ main phase and a Nd-rich phase.

As a preferred technical solution, the rare earth elements include one or both of Dy and Tb, and the metal elements include one or more of Al, Ti, Co, Cr, Ni, Fe, Cu, Nd, and In.

As a preferred technical solution, the diffusion source formed by the magnetron sputtering is a mono-elemental film with a thickness of 50-200 nm, a argon pressure for the magnetron sputtering is 2-5 m Torr, a power of the magnetron sputtering is 50-150 W, a rate of the magnetron sputtering is 0.03-0.15 nm/s, and a temperature of a substrate for the magnetron sputtering does not exceed 60° C.

As a preferred technical solution, in the process of performing the magnetron sputtering the power of the magnetron sputtering is initially set as a lower value and adjusted in real time by monitoring temperatures.

As a preferred technical solution, within the pressure gradient formed in the diamond anvil cell through a Type-IV metal pad structure, a low-pressure conduction zone corresponds to the zone filled with NaCl, a high-pressure retention zone corresponds to the zone filled with c-BN or KBr, and the lateral pressure difference is 2-15 GPa.

As a preferred technical solution, the step of performing local laser heating is executed by way of focusing a 1064 nm or 532 nm wavelength picosecond laser beam on the diffusion source for local irradiation at 500-900° C. for 10-120 minutes.

As the preferred technical solution, the step of performing overall electric heating is executed by way of energizing an external electrode of the diamond anvil cell to raise temperatures and monitoring the temperatures in real time to maintain diffusion in constant temperature.

As a preferred technical solution, the lateral heterojunction formed by the diffusion source enables the elements to directionally diffuse from a diffusion end toward a center of the Nd—Fe—B permanent magnet sample under the action of the pressure gradient, so as to form a diffusion path perpendicular to a main surface of the Nd—Fe—B permanent magnet sample.

As a preferred technical solution, the rare earth elements are controlled to be uniformly distributed at $Nd_2Fe_{14}B$ grain boundaries with the aid of the pressure gradient, so as to enhance coercivity and thermal stability while maintaining magnetic anisotropy and reduce magnetic energy product loss.

The present invention has the following beneficial effects.

1. It is possible for the present invention to enable the rare earth elements to directionally and uniformly diffuse between any two of Nd—Fe—B crystal grains by way of building a controllable lateral pressure gradient, without damaging an orientation structure of Nd—Fe—B magnetic phases. Traditional thermal diffusion processes often depend on a temperature gradient to propel diffusion, resulting in unstable diffusion directions and limited diffusion depths, which cause rare earth elements to be mainly concentrated in a top layer and form a magnet with uneven performance. In the present invention, it is possible to enable the rare earth elements or the metal elements to diffuse stably in a gradient direction under the action of the lateral pressure difference formed by the asymmetrically filled medium in the diamond anvil cell (DAC), so as to fundamentally improve diffusion uniformity and availability of rare earth.
2. In the present invention, the way of adopting a means of magnetron sputtering to form a lateral heterojunction structure, and preparing a diffusion source of rare earth elements or metal elements with a thickness of 50-200 nm on one side of the Nd—Fe—B permanent magnet sample, effectively reduces an energy barrier of diffusion boundaries and increases a rate of diffusing elements. Compared with traditional methods of overall doping or coating, the heterojunction structure can precisely control a composition and thickness of diffusion boundaries, noticeably enhance the bonding stability between the diffusion source and the Nd—Fe—B matrix, and reduce crystal phase distortion caused by excessive local concentration gradients.
3. For the present invention, it is possible to achieve a balance between high-efficient diffusion and crystal structure retention through a process mode that combines a high-pressure gradient with local laser heating. The high-pressure environment makes the $Nd_2Fe_{14}B$ main phase structure denser and more stable, and the way of performing local laser heating or overall electric heating in a 500-900° C. range is helpful to propelling diffusion of rare earth elements at grain boundaries and within grains, while avoiding grain growth or magnetic anisotropy loss caused by overheating, so as to maintain high remanence of magnets.
4. For the present invention, it is possible to enable the rare earth elements to more uniformly penetrate Nd—Fe—B grain boundaries under the action of pressure and form a continuous and stable rare-earth-rich film, which effectively inhibits a demagnetization reaction from occurring at Nd—Fe—B grain boundaries and noticeably enhances coercivity and thermal stability of magnets. A test result shows that, under the premise of the same rare earth content, the intrinsic coercivity of the permanent magnet obtained in the present invention increases by more than 20%, and the magnetic energy product loss decreases by about 10%, presenting an excellent capacity of keeping magnetic properties.
5. The present invention presents simpleness and controllability in processes, and high availability in resources. By combining a high-pressure system with a thin-layer diffusion source in a DAC micro-zone, it is possible to achieve stable reproducibility under laboratory and industrial conditions, avoid the waste of rare earth elements and the environmental pollution existing in a traditional process with high-temperature solid-phase diffusion, enable the preparation of high-performance magnets with low rare earth consumption, and have good economic benefits and potential for widespread application.

The present invention achieves synergistically controlling diffusion of rare earth and metal elements. By selecting a combination of elements such as Dy, Tb, Al, Ti, Co, Ni, and Cu, it is possible to adjust diffusion depth and interfacial energy states according to application scenarios, flexibly build a composite diffusion layer with different gradients, optimize magnetic properties in different temperature ranges, and present extremely high controllability and application potential.

BRIEF DESCRIPTION OF THE DRAWINGS

In order to more clearly describe a technical solution in an embodiment of the present invention or the prior art, we shall briefly introduce figures required for the description of the embodiment or the prior art as follows. It is obvious that the figures described below are only for some examples of the present invention. A person skilled in the art can obtain other figures based on these figures without any inventive work.

DETAILED DESCRIPTION OF SOME EMBODIMENTS

Figure 1:
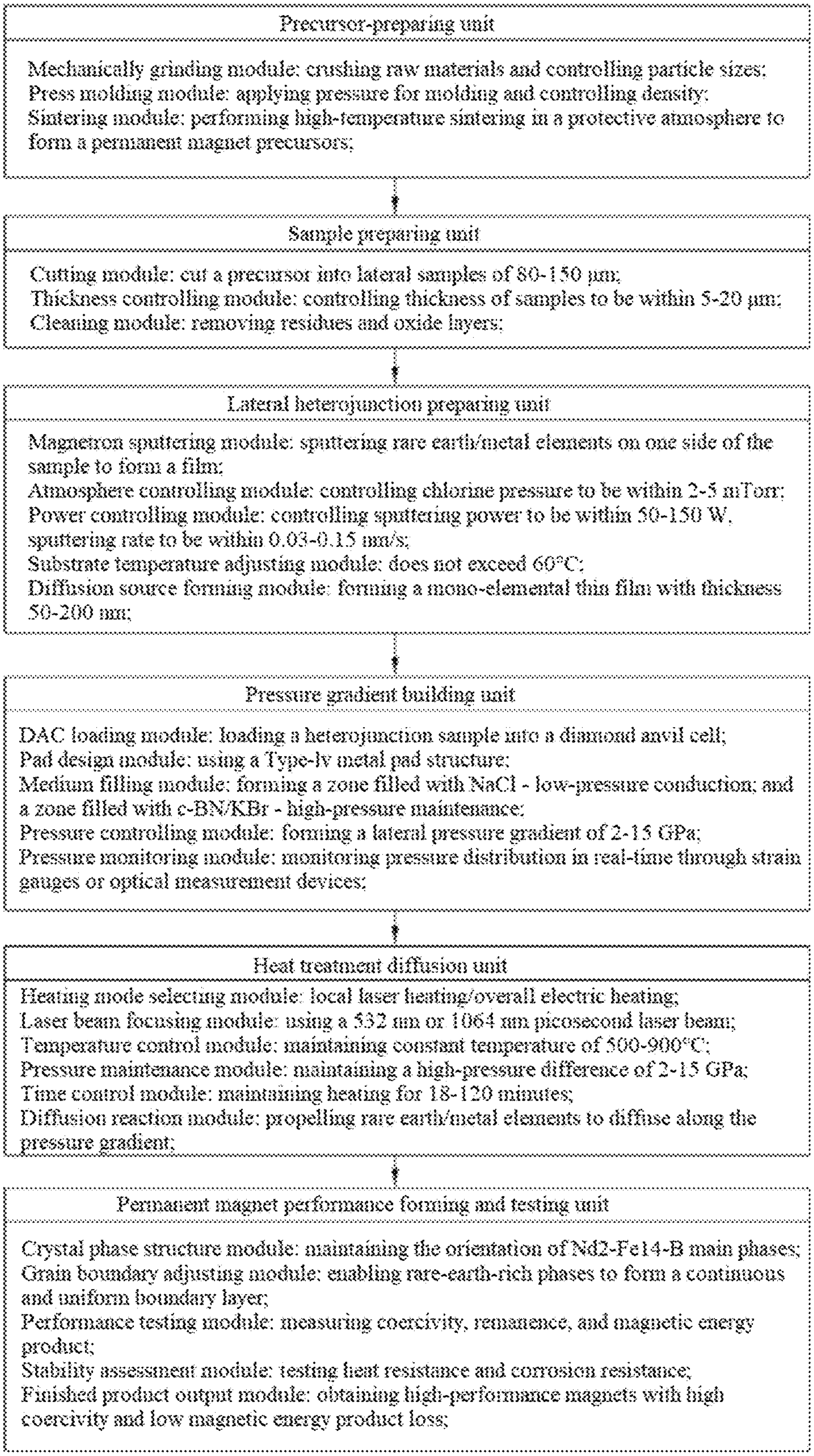
FIG. 1 is a block diagram of the system for preparing Nd—Fe—B-diffused permanent magnets based on pressure gradients according to the present invention.
Figure 2:
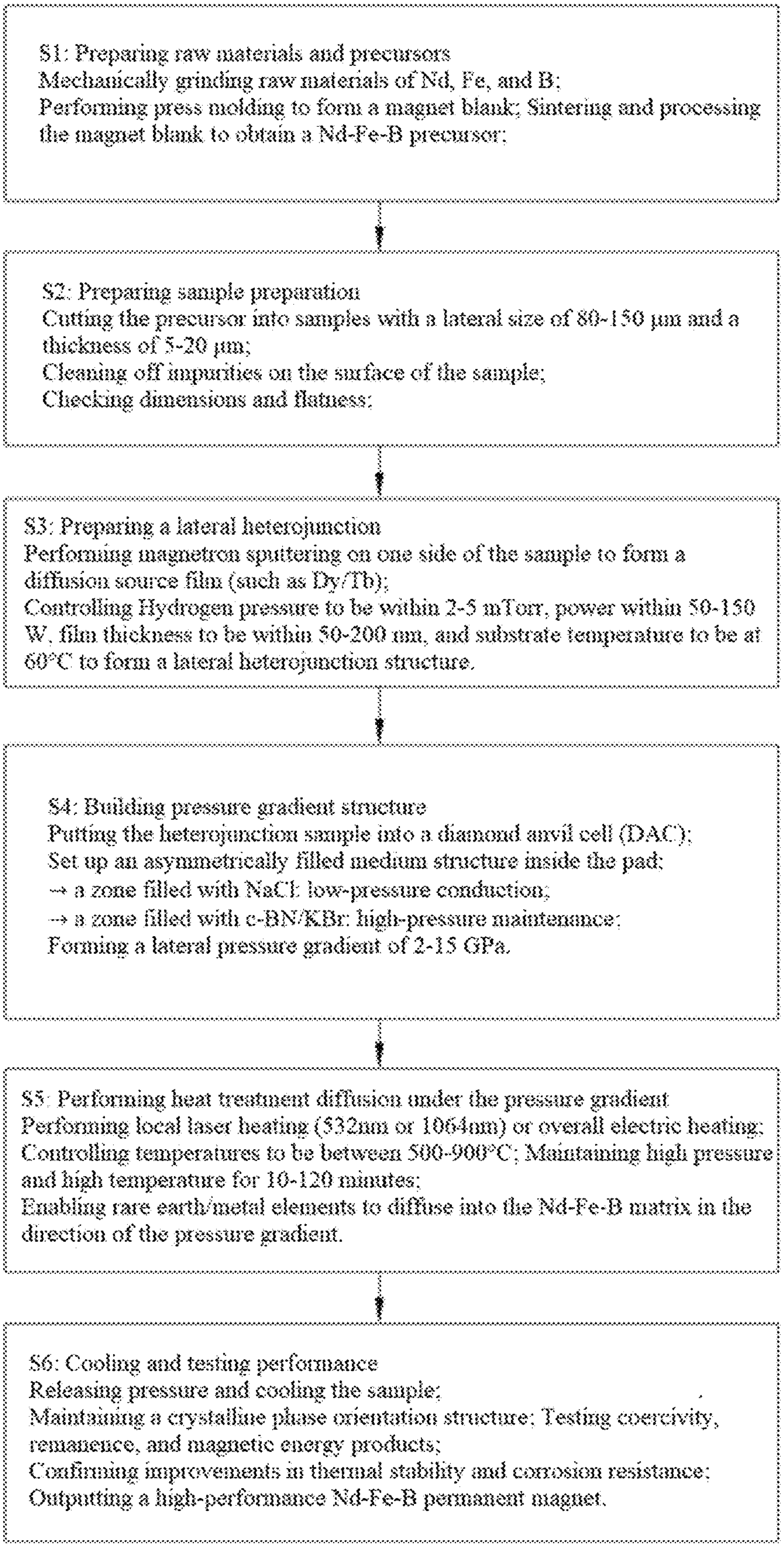
FIG. 2 is a flowchart of the method for preparing Nd—Fe—B-diffused permanent magnets based on pressure gradients according to the present invention.

All features disclosed herein or steps of all methods or processes disclosed herein, except features and/or steps that are mutually exclusive, can be combined with each other in any way.

Any feature disclosed herein (including any claim, abstract, and figure), unless specified otherwise, may be replaced with other equivalent or alternative features serving a similar function. In other words, unless specified otherwise, each feature is merely an example among a series of equivalent or similar features.

The present invention provides a method for preparing Nd—Fe—B-diffused permanent magnets based on pressure gradients according to the present invention, a specific embodiment of which is as follows.

Firstly, there exists a step of preparing a Nd—Fe—B permanent magnet precursor through a mechanical grinding process, a press molding process, and a sintering process. High-purity Nd, Fe, B, and necessary additive elements are selected as raw materials to ensure accuracy of component ratios. High-energy ball milling equipment is used in the mechanical grinding process to control a powder particle size to be within a micrometer range, so as to ensure high density of the press molding process subsequent to it. The powder that has been evenly mixed, is isostatically pressed in a mold under a pressure controlled within a range of 200-300 MPa, so that a blank has good compactness and formability strength. Then, a formed blank is placed in a vacuum sintering furnace and sintered at 950-1100° C. for 1-4 hours to obtain a densified Nd—Fe—B permanent magnet precursor, which mainly contains a $Nd_2Fe_{14}B$ main phase and a Nd-rich phase surrounding a grain boundary. The Nd-rich phase can serve as a diffusion path in a subsequent process of rare earth diffusion, performing a function of auxiliary guidance.

Then, there exists a step of mechanically cutting the obtained Nd—Fe—B permanent magnet precursor into a Nd—Fe—B permanent magnet sample with a lateral size of 80-150 μm and a thickness of 5-20 μm by means of a wire cutting device or an ultrasonic vibration slicer. After cutting, the Nd—Fe—B permanent magnet sample is washed ultrasonically with acetone or anhydrous ethanol to remove oil stains, micro powder, and oxide layers that are remaining in the cutting process, ensuring the sample has a smooth and flat surface, which provides an ideal substrate for subsequently depositing a film. The sample is stored in an inert atmosphere after drying to prevent oxidation.

Next, there exists a step of preparing a lateral heterojunction structure on one side of the sample. A mono-elemental film of rare earth elements or other metallic elements is deposited on the surface of the sample as the diffusion source by adopting magnetron sputtering. Preferably, the rare earth elements are one or both of Dy and Tb, and the metal elements may be selected from one or more combinations of Al, Ti, Co, Cr, Ni, Fe, Cu, Nd, and In. The magnetron sputtering is carried out in a vacuum chamber with a degree of vacuum less than $5\times10^{-4}$ Pa in an inert atmosphere of argon under an operation pressure maintained at 2-5 mTorr (0.27-0.67 Pa). The sputtering power is controlled within a range of 50-150 W and the sputtering rate is 0.03-0.15 nm/s, so as to ensure that a resultant film is dense and uniform. In the process of performing the magnetron sputtering the power of the magnetron sputtering is initially set as a lower value and the temperatures of the sample are monitored in real-time by means of an infrared thermometer, so as to prevent crystal phases from being damaged due to the temperatures exceeding 60° C. After finishing deposition, the film thickness of the diffusion source is controlled to be within a range of 50-200 nm, forming a stable lateral heterojunction structure.

Subsequently, there exists a step of putting the resultant lateral heterojunction into a diamond anvil cell (DAC), so as to build a lateral pressure gradient. The DAC involves a Type-IV metal pad, in the center of which a sample chamber is set, and a diffusion source film end and a Nd—Fe—B sample end are arranged sequentially inside the sample chamber. In order to form a stable pressure gradient, the side where the diffusion source lies, is filled with NaCl powder, serving as a low-pressure conductive medium, while the other end of the sample is filled with c-BN or KBr powder, serving as a high-pressure retention medium. The difference between elastic moduli of such both ends generates a lateral pressure difference of 2-15 GPa. By way of applying pressure through a fine-tuning spiral loading mechanism, and precisely monitoring pressure changes by online Raman spectroscopy or fluorescence pressure measurement, it is possible to ensure formation of a stable lateral pressure gradient. The zone filled with NaCl serves as a stress-buffering layer, ensuring that the stress at the diffusion source end can conduct evenly, while the zone filled with c-BN or KBr can maintain a high-pressure state due to its higher rigidity, so as to form a continuous propelling force for the pressure difference in the lateral direction of the sample.

There exists a step of after building the pressure gradient, performing heat treatment diffusion under the pressure gradient. Two heating methods are adopted at the diffusion stage: local laser heating and overall electric heating. The method of local laser heating is executed by way of focusing a 1064 nm or 532 nm wavelength picosecond laser beam with a focused light spot diameter controlled at 20-50 micrometers, so as to locally irradiate the diffusion source with high energy density. The laser power is automatically adjusted based on real-time temperature feedback, so that the local temperature of the sample keeps within a range of 500-900° C. In cases of adopting overall electric heating, it is possible to apply currents through external electrodes of the DA, so as to energize and heat a metal pad, and use a thermocouple or infrared thermometer to monitor the temperature in real time, maintaining a constant temperature state in the diffusion zone. The heating time is 10-120 minutes, during which rare earth elements or metal elements disperse directionally in a thickness direction of the sample from the diffusion source end under the lateral pressure gradient, so as to penetrate the grain boundaries into the $Nd_2Fe_{14}B$ grains or a boundary zone of the $Nd_2Fe_{14}B$ grains. Under the synergistic action of the pressure gradient and temperature, an element diffusion rate noticeably increases, and a diffusion path is perpendicular to the main surface of the sample, forming a continuous and uniform rare-earth-rich boundary layer.

There exists a step of after heat treatment, gradually releasing the pressure and cooling the sample. The process of cooling the sample adopts a approach of slowly reducing pressure, so as to prevent stress and cracks. After cooling the sample to room temperature, the microstructure and magnetic properties of the sample are tested. A microscopic analysis shows that the rare earth elements form a continuous film of rare-earth-rich phases at the $Nd_2Fe_{14}B$ grain boundaries, which effectively blocks a demagnetization path at the grain boundaries. A test result of magnetic properties shows that, under the premise of the same rare earth content, the sample treated by the method of the present invention has intrinsic coercivity increasing by more than 20% higher than that of traditional thermal diffusion processes, and magnetic energy product loss decreasing by about 10%, and maintains stable magnetic properties even at more than 150° C.

TABLE 1

| Sample No. | Category | Intrinsic coercivity Hcj (kOe) | Remanence Br (KGs) | Maximum magnetic energy product (BHmax, MGOe) |
|---|---|---|---|---|
| 1 | Example 1 (diffusion under the pressure gradient, 5 GPa) | 17.8 | 12.2 | 45.1 |
| 2 | Control 1 (diffusion without pressure) | 14.6 | 12.3 | 41.0 |
| 3 | Example 2 (diffusion under the pressure gradient, 10 GPa) | 18.5 | 12.0 | 46.2 |
| 4 | Control 2 (diffusion without pressure) | 15.0 | 12.1 | 41.5 |

Table 1 is a table depicting a comparison between magnetic properties of a sample of the present invention and that of a control.

Compared with Control 1, Example 1 shows an increase of about 22% in Hcj and an increase of about 10% in BHmax under the conditions of the same Tb diffusion system. This indicates that under the action of the pressure gradient of 5 GPa, the Tb element can diffuse more deeply and uniformly into the $Nd_2Fe_{14}B$ grain boundaries, so as to form a continuous rare-earth-rich layer, thereby noticeably enhancing coercivity.

Compared with Control 2, Example 2 shows that the pressure gradient further increases to 10 GPa, Hcj increases by about 25%, and the magnetic energy product loss is better controlled. This indicates that this method achieves higher availability of rare-earth utilization and performance balance while maintaining crystal phase orientation.

From this embodiment, it can be seen that it is possible for the present invention to achieve the directional and uniform diffusion of rare earth elements in the matrix without destroying damaging an orientation structure of $Nd_2Fe_{14}B$ magnetic phases, and noticeably enhance coercivity and thermal stability of Nd—Fe—B permanent magnets, while maintaining high remanence and relatively low magnetic energy product loss. The present invention has a clear process route in its entirety, high controllability, and high reproducibility, achieves a significant improvement in availability of rare earth resources, and presents promising potential for industrial application.

The above description is only a specific embodiment of the present invention, but does not pose any limitations on the protection scope of the present invention. Any changes or substitutions that are thought of without inventive work should fall within the scope of the present invention. Therefore, the protection scope of the present invention should be subjected to the scope defined in the claims.

What is claimed is:

1. A method for preparing Nd—Fe—B-diffused permanent magnets based on pressure gradients, comprising the steps of (1) preparing a Nd—Fe—B permanent magnet precursor through a mechanical grinding process, a press molding process, and a sintering process;

(2) cutting the Nd—Fe—B permanent magnet precursor into a Nd—Fe—B permanent magnet sample with a lateral size of 80-150 μm and a thickness of 5-20 μm;

(3) forming a film of rare earth elements or other metal elements on one side of the Nd—Fe—B permanent magnet sample by magnetron sputtering as a diffusion source, so as to obtain a lateral heterojunction structure;

(4) putting the lateral heterojunction structure into a diamond anvil cell (DAC), and setting an asymmetrically filled medium zone inside a pad of the diamond anvil cell, which has one end as the diffusion source filled with NaCl, and another end filled with c-BN or KBr, so as to form a lateral pressure difference; and (5) performing local laser heating or overall electric heating while maintaining a pressure gradient, so that the rare earth elements or the metal elements in the diffusion source to diffuse into a Nd—Fe—B matrix, so as obtain a high-performance Nd—Fe—B permanent magnet;

wherein within the pressure gradient formed in the diamond anvil cell through a Type-IV metal pad structure, a low-pressure conduction zone corresponds to the zone filled with NaCl, a high-pressure retention zone corresponds to the zone filled with c-BN or KBr, and the lateral pressure difference is 2-15 GPa.

2. The method for preparing Nd—Fe—B-diffused permanent magnets based on pressure gradients according to claim 1, wherein the Nd—Fe—B permanent magnet precursor contains an $Nd_2Fe_{14}B$ main phase and a Nd-rich phase.

3. The method for preparing Nd—Fe—B-diffused permanent magnets based on pressure gradients according to claim 1, wherein the rare earth elements include one or both of Dy and Tb, and the metal elements include one or more of Al, Ti, Co, Cr, Ni, Fe, Cu, Nd, and In.

4. The method for preparing Nd—Fe—B-diffused permanent magnets based on pressure gradients according to claim 1, wherein the diffusion source formed by the magnetron sputtering is a mono-elemental film with a thickness of 50-200 nm, a argon pressure for the magnetron sputtering is 2-5 mTorr, a power of the magnetron sputtering is 50-150 W, a rate of the magnetron sputtering is 0.03-0.15 nm/s, and a temperature of a substrate for the magnetron sputtering does not exceed 60° C.

5. The method for preparing Nd—Fe—B-diffused permanent magnets based on pressure gradients according to claim 1, wherein in the process of performing the magnetron sputtering the power of the magnetron sputtering is initially set as a lower value and adjusted in real time by monitoring temperatures.

6. The method for preparing Nd—Fe—B-diffused permanent magnets based on pressure gradients according to claim 1, wherein the step of performing local laser heating is executed by way of focusing a 1064 nm or 532 nm wavelength picosecond laser beam on the diffusion source for local irradiation at 500-900° C. for 10-120 minutes.

7. The method for preparing Nd—Fe—B-diffused permanent magnets based on pressure gradients according to claim 1, wherein the step of performing overall electric heating is executed by way of energizing an external electrode of the diamond anvil cell to raise temperatures and monitoring the temperatures in real time to maintain diffusion in constant temperature.

8. The method for preparing Nd—Fe—B-diffused permanent magnets based on pressure gradients according to claim 1, wherein the lateral heterojunction formed by the diffusion source causes the elements to directionally diffuse from a diffusion end toward a center of the Nd—Fe—B permanent magnet sample under the action of the pressure gradient, so as to form a diffusion path perpendicular to a main surface of the Nd—Fe—B permanent magnet sample.

9. The method for preparing Nd—Fe—B-diffused permanent magnets based on pressure gradients according to claim 1, wherein the rare earth elements are controlled to be uniformly distributed at $Nd_2Fe_{14}B$ grain boundaries with the aid of the pressure gradient, so as to enhance coercivity and thermal stability while maintaining magnetic anisotropy and reduce magnetic energy product loss.

* * * * *